Figure 6:
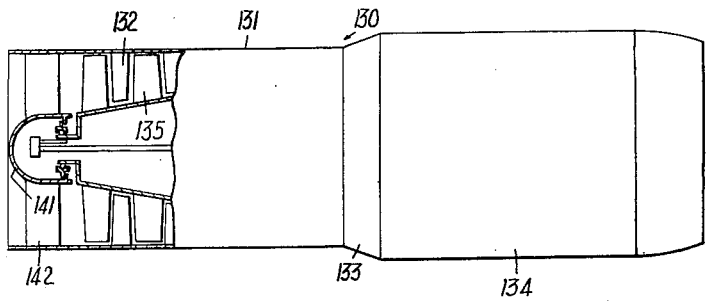

March 29, 1966     B. DIVER ETAL     3,243,243
BEARING ASSEMBLY
Filed Dec. 27, 1963     5 Sheets-Sheet 1
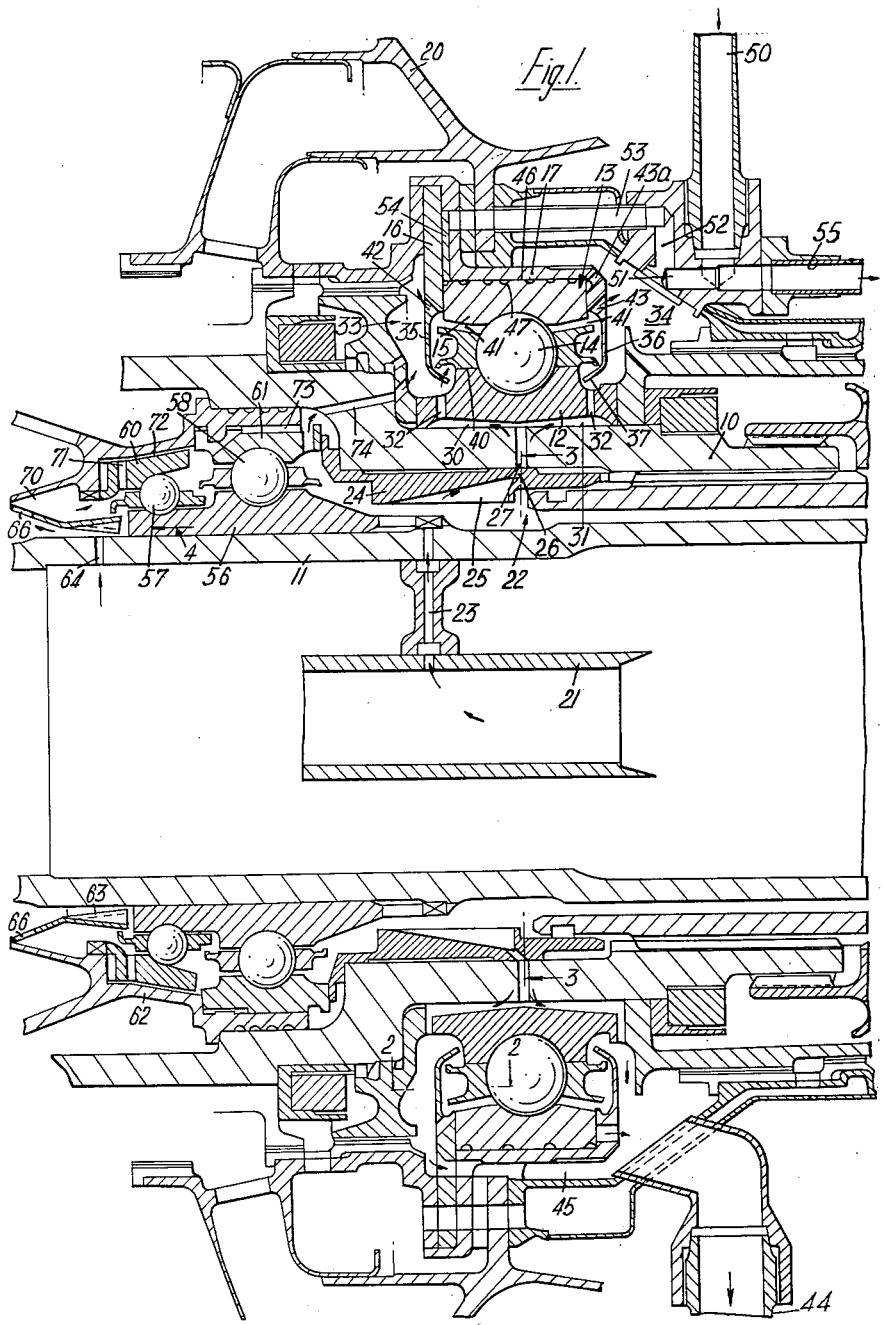

March 29, 1966  B. DIVER ETAL  3,243,243
BEARING ASSEMBLY
Filed Dec. 27, 1963  5 Sheets-Sheet 2
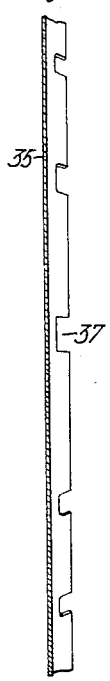
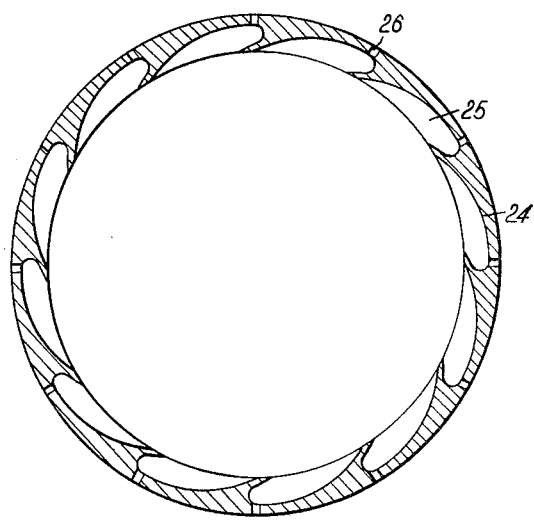
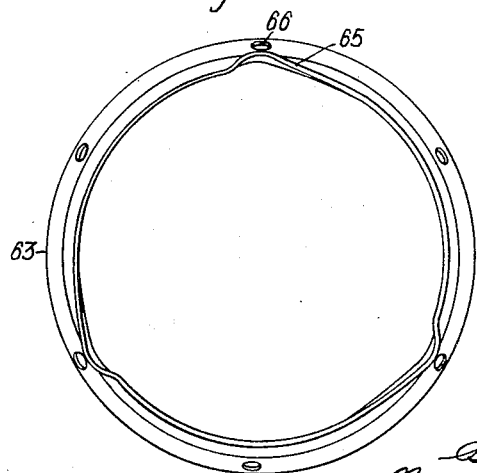
Inventors
Bernard Diver
Norman Robert Robinson
Welfred Henry Williamson
By Cushman, Darby & Cushman
Attorneys

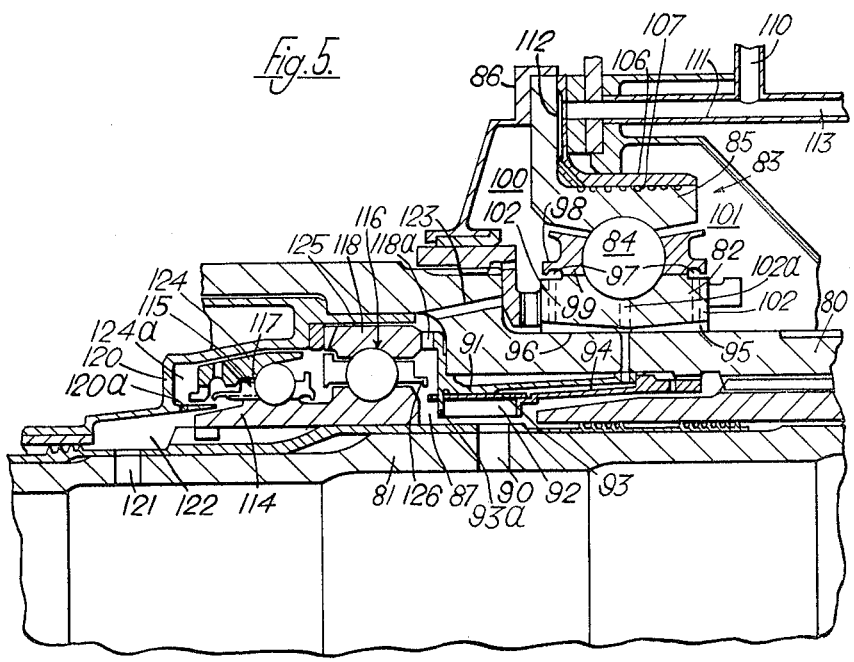

March 29, 1966　　　B. DIVER ETAL　　　3,243,243
BEARING ASSEMBLY

Filed Dec. 27, 1963　　　　　　　　　　　5 Sheets-Sheet 4

Inventors
Bernard Diver
Norman Robert Robinson
Wilfred Henry Wilkinson
By Cushman, Darby & Cushman
Attorneys United States Patent Office 3,243,243
Patented Mar. 29, 1966

3,243,243
BEARING ASSEMBLY
Bernard Diver, Norman Robert Robinson, and Wilfred Henry Wilkinson, all of Derby, England, assignors to Rolls-Royce Limited, Derby, England, a company of Great Britain
Filed Dec. 27, 1963, Ser. No. 333,911
Claims priority, application Great Britain, Jan. 9, 1963, 1,087/63; Oct. 25, 1963, 42,238/63, 42,239/63
8 Claims. (Cl. 308—187)

This invention concerns a bearing assembly.

According to the present invention, there is provided a bearing assembly comprising a fixed annular outer race, a rotatable annular inner race which is mounted concentrically within the said outer race and which is spaced therefrom by rolling elements which are in rolling contact with said inner and outer races, the inner race having a plurality of radially outwardly inclined axially extending passages therein which respectively communicate, adjacent their radially outermost ends, with the axially spaced opposite sides of the bearing assembly, the radially inner ends of the said passages communicating with or forming part of the inner circumferential surface of the inner race, and means for supplying lubricant to the said inner circumferential surface of the inner race, whereby, in operation, the lubricant is centrifugally forced radially outwardly through the said passages to the said opposite sides.

The term "rolling elements" as used in this specification is intended to include ball bearings, roller bearings, needle bearings and the like.

Preferably each of the said passages comprises a tapered groove in the inner circumferential surface of the inner race. Thus the inner race may be provided with holes which respectively communicate with the deepest parts of the said grooves and with the said opposite sides.

The shallowest parts of all the said grooves may be disposed midway between the said opposite sides.

Alternatively, some of the said grooves have their shallowest parts disposed adjacent one said side of the bearing assembly and their deepest parts disposed adjacent the opposite side of the bearing assembly, and the remaining grooves have the shallowest parts disposed adjacent the said opposite side of the bearing assembly and their deepest parts disposed adjacent the said one side of the bearing assembly. In this case, the said same grooves and the said remaining grooves preferably alternate with each other. Thus, each of the said grooves may be substantially triangular in plan and has its shallowest and deepest parts at the apex and the base respectively of the triangle, the apex of each groove being disposed in alignment with and between the bases of the two adjacent grooves.

Preferably the bearing assembly is provided on its said opposite sides with lubricant traps which are adapted to be supplied with lubricant from the said passages.

The invention also comprises a gas turbine engine provided with a bearing assembly as set forth above.

Figure 7:
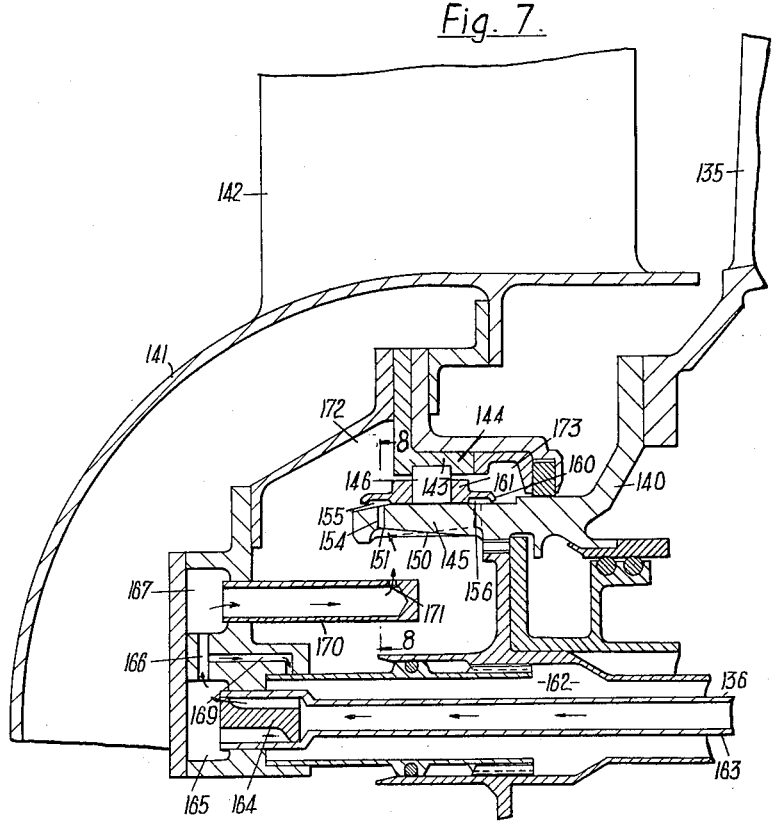
Figure 8:
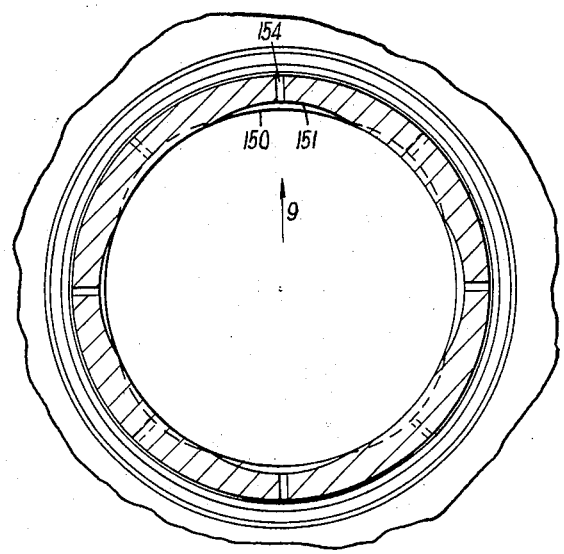
Figure 9:
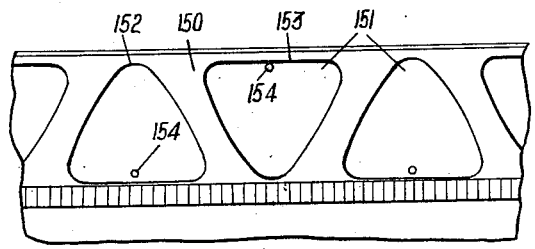

The invention is illustrated, merely by way of example, in the accompanying drawings, in which:

FIGURE 1 is a broken away section of part of a first embodiment of a gas turbine engine provided with a bearing assembly according to the present invention, FIGURE 2 is a broken away section taken on the line 2—2 of FIGURE 1, FIGURE 3 is a section taken on the line 3—3 of FIGURE 1, FIGURE 4 is a view looking in the direction of the arrow 4 of FIGURE 1, FIGURE 5 is a broken away section of part of a second embodiment of a gas turbine engine provided with a bearing assembly according to the present invention, FIGURE 6 is a schematic view, partly in section, of a third embodiment of a gas turbine engine provided with a bearing assembly according to the present invention, FIGURE 7 is a broken away section showing part of the structure of FIGURE 6 on a larger scale, FIGURE 8 is a broken away section taken on the line 8—8 of FIGURE 7, and FIGURE 9 is a developed view looking in the direction of the arrow 9 of FIGURE 8.

Referring first to FIGURES 1–4 of the drawings, a gas turbine engine is provided with a shaft 10 on which are mounted a high pressure compressor and a high pressure turbine (not shown). Concentrically mounted and nested within the shaft 10 is a shaft 11 on which are mounted a low pressure compressor and a low pressure turbine (not shown).

The shaft 10, adjacent its rear end, is mounted concentrically within a rotatable annular inner race 12 of a thrust bearing 13. The bearing 13, which constitutes the main thrust bearing of the engine, has ball bearings 14 which are in rolling contact with the inner race 12 and with a fixed annular outer race 15 which is mounted concentrically about the inner race 12. The outer race 15 is mounted within two annular members 16, 17 which are secured to each other and to fixed structure 20.

Mounted concentrically within the shaft 11 is a lubricant pipe 21. Between the shafts 10, 11 there is a space 22 which, in operation, is centrifugally supplied with lubricant from the lubricant pipe 21 by way of radially extending lubricant passages 23.

Securely mounted within the shaft 10 is an annular member 24 which bounds the space 22. The internal surface of the annular member 24 is recessed to form a plurality of angularly spaced apart pockets 25, each of which is adapted in operation to retain a quantity of lubricant therein. Each of the pockets 25 communicates with a drilling 26 and is shaped to direct lubricant centrifugally into the respective drilling 26. Each drilling 26 communicates with a lubricant passage 27 which leads to radially inner (i.e. the shallowest) parts of a plurality of axially extending radially outwardly inclined, tapered grooves 30 in the inner circumferential surface 31 of the inner race 12. The said shallowest parts of the grooves 30 are disposed midway between the axially spaced opposite sides of the bearing 13.

The radially outermost end of each groove 30 communicates by way of a drilling 32 with annular chambers 33, 34 which are respectively disposed immediately upstream and downstream of the bearing 13.

It will be appreciated that the lubricant flow which will, in operation, be forced centrifugally radially outwardly through the grooves 30 will serve to cool the inner race 12 by taking away heat which has been conducted thereto through the shaft 10 and/or has been generated within the bearing.

The annular members 16, 17 have slotted portions 35, 36 respectively which are respectively arranged to form boundary surfaces of the annular chambers 33, 34. The portions 35, 36 have slots 37 therein which serve to give a very fine metering control of a flow of lubricant therethrough from the drillings 32 to lubricant ducts 40 leading to the ball bearings 14.

Lubricant which has been used in lubricating the ball bearings 14 passes through lubricant ducts 41 and through drillings 42, 43 in the annular members 16, 17 respectively to the annular chambers 33, 34 respectively. Lubricant which has thus been used in cooling and lubricating the bearing 13 passes to a scavenge passage 44. The latter communicates directly with the annular chamber 34 and communicates with the annular chamber 33 by way of a passage 45.

The outer circumferential surface 46 of the outer race 15 has grooves 47 therein which are supplied with lubricant from a lubricant conduit 50 by way of conduits 51, 52, 53, 54. The lubricant which has flowed through the grooves 47 and which has thus cooled the outer race 15 passes trough drillings 43a into the annular chamber 34 and thence to the scavenge passage 44.

Some of the lubricant from the lubricant conduit 50 may pass via a conduit 55 to the rear bearing (not shown) of the engine.

The shaft 11 is mounted concentrically within a sleeve 56 which constitutes an inner race of intershaft ball bearings 57, 58. The latter have outer races 60, 61, respectively which are mounted within a sleeve member 62 which is itself mounted within the shaft 10.

The sleeve member 62 carries a substantially frusto-conical member 63 (best seen in FIG. 4) which is provided with a series of holes 66. Lubricant from the interior of the shaft 11 may pass centrifugally to the frusto-conical member 63 by way of drillings 64 in the shaft 11, the drillings 64 communicating with the lubricant pipe 21 by means not shown. The frusto-conical member 63 is formed with scoops 65 (FIG. 4) which direct a portion of the lubricant which passes onto the frusto-conical member 63 from the drillings 64 to the ball bearings 57 and thence to the ball bearings 58, after which the lubricant is passed via drillings 74 in the shaft 10 to the annular chamber 33 and finally via the passage 45 to the scavenge passage 44.

Some of the lubricant which has passed through the drillings 64 is centrifuged up the inner surface of the frusto-conical member 63 and flows through the holes 66 to an annular chamber 70 imediately upstream of the ball bearings 57. This flow of lubricant passes from the annular chamber 70 and via drillings 71 to grooves 72 provided in the outer circumferential surface of the outer race 60. Lubricant which has flowed through the grooves 72, and which has thus cooled the outer race 60, passes axially through grooves 73 in the outer circumferential surface of the outer race 61 so as to cool the latter. This lubricant then passes into the annular chamber 33 by way of the drillings 74 in the shaft 10.

It will be seen that, where possible in practice, the lubricating oil supply to each bearing is divided into two flows, one flow serving to lubricate the rolling elements of the bearing and the other flow serving to cool the inner or the outer race. It is preferable that the oil which has served as a cooling medium is not afterwards passed to the rolling elements to serve as a lubricant.

Referring now to FIGURE 5, a gas turbine engine is provided with a shaft 80 on which are mounted a high pressure compressor and a high pressure turbine (not shown). Concentrically mounted within the shaft 80 is a shaft 81 on which are mounted a low pressure compressor and a low pressure turbine (not shown).

The shaft 80, adjacent its rear end, is mounted concentrically within and is secured to a rotatable annular inner race 82 of the main thrust bearing 83 of the engine. The bearing 83 has ball bearings 84 which are in rolling contact with the inner race 82 and with a fixed annular outer race 85 which is mounted concentrically about the inner race 82. The outer race 85 is secured to fixed structure 86.

Between the shafts 80, 81 there is a space 87 which, in operation, is centrifugally supplied with lubricant from the interior of the shaft 81 by way of radially extending lubricant passages 90 in the shaft 81.

Securely mounted within the shaft 80 is an annular member 91 which extends into and receives lubricant from the space 87. The annular member 91 is provided with a plurality of angularly spaced apart pockets 92, each of which extends to the inner circumferential surface of the annular member 91 and each of which, in operation, retains a quantity of lubricant therein. Some of the pockets 92 communicate with drillings 93 into which the lubricant is centrifuged from the pockets 92, the remaining pockets communicating with drillings 93a. Each drilling 93 communicates with a lubricant passage 94. The lubricant passage 94 leads via drillings in the shaft 80 to the radially inner (i.e. the shallowest) parts of a plurality of extending radially outwardly inclined, tapered, grooves 95 which are provided in the inner circumferential surface 96 of the inner race 82. The said shallowest parts of the grooves 95 are disposed midway between the axially spaced, opposite sides of the bearing 83. The radially outermost ends of the various grooves 95 communicate with annular chambers 100, 101 which are respectively disposed immediately upstream and downstream of the bearing 83.

It will be appreciated that the lubricant flow which will, in operation, be forced centrifugally radially outwardly through the grooves 95 will serve to cool the inner race 82.

Some of the grooves 95 communicate, adjacent their radially outermost ends (i.e. adjacent their deepest parts) with holes 102 in the inner race 82 which lead to lubricant traps 97, the latter being formed by flange 98 on the bearing cage 99. Lubricant supplied to the passages 102 and hence to the traps 97 passes between the cage 99 and the inner race 82 to effect lubrication of the ball bearings 84 and then passes out between the cage 99 and the outer race 85 so as to pass into the annular chambers 100, 101. Lubricant which has thus been used in cooling and lubricating the bearing 83 passes from the annular chambers 100, 101, to a scavenge passage (not shown).

The outer circumferential surface 106 of the outer race 85 has grooves 107 therein which are supplied with lubricant from a lubricant conduit 110 by way of conduits 111, 112. The lubricant which has flowed through the grooves 107 and which has thus cooled the outer race 85 passes into te annular chamber 101, and thence to the said scavenge passage.

Some of the lubricant from the lubricant conduit 110 may pass via a conduit 113 to the rear bearing (not shown) of the engine.

The shaft 81 is mounted concentrically within a sleeve 114 which constitutes an inner race of inter-shaft ball bearings 115, 116. The latter have outer races 117, 118 respectively which are mounted within a sleeve member 120 which is itself mounted within the shaft 80.

Lubricant from the interior of the shaft 81 may pass centrifugally, via radially extending passages 121 in the shaft 81, to an annular chamber 122 within the sleeve member 120.

Some of the lubricant in the chamber 122 flows therefrom along a frusto-conical surface provided on the sleeve member 120 and through the bearing 115, so as to lubricate the latter. A proportion of the lubricant which flows along the said frusto-conical surface passes through drillings 120a, provided in the said frusto-conical surface, to an annular chamber 124a.

The lubricant from the chamber 124a flows successively through grooves 124, 125 provided in the outer circumferential surfaces of the outer races 117, 118 respectively, so as to cool the latter, and then flows via drillings 123 and the chamber 100 to the said scavenge passage.

The bearing 116 is lubricated by lubricant from the pockets 92 which communicate with the drillings 93a, which lubricant is picked-up by an inwardly directed lip 126 provided on the cage member of the bearing 116. After lubricating the bearing 116, the lubricant passes through apertures 118a and then through the drillings 123 and the chamber 100 to the said scavenge passage.

Instead of providing the inner race 82 with the holes 102 for supplying the lubricant to the balls 84 these holes may be dispensed with and replaced by holes 102a which communicate directly with the balls 84. This ensures that the lubricant which passes to the balls 84 through the holes 102a has not received heat by cooling the inner race 82.

Referring now to FIGURES 6–9, a gas turbine engine 130 comprises an engine casing 131 within which are arranged in flow series a compressor 132, combustion equipment 133, and turbine 134.

The compressor 132 has a rotor 135 which is driven from the turbine 134 through the engine main shaft 136, the latter having an extension in the form of a sleeve 140 which is secured to the rotor 135.

A nose cone 141 is mounted within the engine casing 131 and supported therefrom by a plurality of angularly spaced apart intake struts 142. Mounted within and secured to the nose cone 141 is a fixed annular outer race 143 of a bearing 144.

A rotatable annular inner race 145, which forms part of the sleeve 140, is mounted concentrically within the outer race 143 and is spaced therefrom by roller bearings 146 which are in rolling contact with the outer and inner races 143, 145.

The inner race 145 has an inner circumferential surface 150 which is provided with a plurality of axially extending, radially outwardly inclined, tapered grooves 151.

Each of the grooves 151 is, as shown in FIG. 9, substantially triangular in plan and has its shallowest and deepest parts at the apex 152 and the base 153 respectively of the triangle. The apex 152 of each groove 151 is disposed in alignment with and between the bases 153 of the two adjacent grooves 151.

Some of the grooves 151 have their shallowest and deepest parts respectively disposed on the upstream and downstream sides of the bearing 144, while the remaining grooves 151 have their shallowest and deepest parts respectively disposed on the downstream and upstream sides of the bearing 144.

The inner race 145 is provided with holes 154 which respectively communicate with the radially outermost (i.e. the deepest) parts of the grooves 151, the holes 154 leading to lubricant traps 155, 156 on the upstream and downstream sides respectively of the bearing 144. The lubricant traps 155, 156 are formed by flanges 160 on the cage 161 of the bearing 144.

The arrangement is thus such that alternate grooves 151 extend to opposite sides of the bearing 144.

Mounted concentrically within the main shaft 136 and spaced therefrom by an annular space 162 is a lubricant pipe 163 along which lubricant may be forced upstream by a pump (not shown).

Lubricant reaching the upstream end of the lubricant pipe 163 passes through a filter 164, chamber 165, and drillings 166, to annular chamber 167. The latter communicates with axially extending pipes 170 having apertures 171 therein through which the lubricant passes radially outwardly so as to be received on the inner circumferential surface 150 of the inner race 145.

In operation, the lubricant reaching the inner circumferential surface 150 will be centrifugally forced radially outwardly through the grooves 151 to the lubricant traps 155, 156. The lubricant will then pass between the cage 161 and the inner race 145 so as to reach the roller bearings 146. Thereafter the lubricant will travel away from the roller bearings 146 by flowing between the cage 161 and the outer race 143 so as to pass to chambers 172, 173 from which it is scavenged (by means not shown).

We claim:

1. A bearing assembly comprising a fixed annular outer race, a rotatable annular inner race which is mounted concentrically within the said outer race and which is spaced therefrom, rolling elements which are in rolling contact with said inner and outer races, the inner race having a plurality of radially outwardly inclined axially extending passages therein which respectively communicate, adjacent their radially outermost ends, with the axially spaced opposite sides of the bearing assembly, the radially inner ends of the said passages communicating with the inner circumferential surface of the inner race, and means for supplying lubricant to the said inner circumferential surface of the inner race, whereby, in operation, the lubricant is centrifugally forced radially outwardly through the said passages to the said opposite sides.

2. A bearing assembly comprising a fixed annular outer race, a rotatable annular inner race which is mounted concentrically within the said outer race and which is spaced therefrom, rolling elements which are in rolling contact with said inner and outer races, the inner race having in its inner circumferential surface a plurality of radially outwardly inclined axially extending tapered grooves therein which respectively communicate, adjacent their radially outermost ends with the axially spaced opposite sides of the bearing assembly, and means for supplying lubricant to the said inner circumferential surface of the inner race, whereby, in operation, the lubricant is centrifugally forced radially outwardly through the said grooves to the said opposite sides.

3. A bearing assembly comprising a fixed annular outer race, a rotatable annular inner race which is mounted concentrically within the said outer race and which is spaced therefrom, rolling elements which are in rolling contact with said inner and outer races, the inner race having in its inner circumferential surface a plurality of radially outwardly inclined axially extending stapered grooves therein which respectively communicate, adjacent their radially outermost ends with the axially spaced opposite sides of the bearing assembly, the inner race being provided with holes which respectively communicate with the deepest parts of the said grooves and with the said opposite sides, and means for supplying lubricant to the said inner circumferential surface of the inner race, whereby, in operation, the lubricant is centrifugally forced radially outwardly through the said grooves to the said opposite sides.

4. A bearing assembly as claimed in claim 3 in which the shallowest parts of all the said grooves are disposed midway between the said opposite sides.

5. A bearing assembly as claimed in claim 3 in which some of the said grooves have their shallowest parts disposed adjacent one said side of the bearing assembly and their deepest parts disposed adjacent the opposite side of the bearing assembly, and the remaining grooves have their shallowest parts disposed adjacent the said opposite side of the bearing assembly and their deepest parts disposed adjacent the said one side of the bearing assembly.

6. A bearing assembly as claimed in claim 5 in which the said some grooves and the said remaining grooves alternate with each other.

7. A bearing assembly as claimed in claim 6 in which each of the grooves is substantially triangular in plan and has its shallowest and deepest parts at the apex and the base respectively of the triangle, the apex of each groove being disposed in alignment with and between the bases of the two adjacent grooves.

8. A bearing assembly comprising a fixed annular outer race, a rotatable annular inner race which is mounted concentrically within the said outer race and which is spaced therefrom, rolling elements which are in rolling contact with said inner and outer races, the inner race having in its inner circumferential surface a plurality of radially outwardly inclined axially extending tapered grooves therein which respectively communicate, adjacent their radially outermost ends with the axially spaced opposite sides of the bearing assembly, the inner race being provided with holes which respectively communicate with the deepest parts of the said grooves and with the said opposite sides, means for supplying lubricant to the said inner circumferential surface of the inner race, whereby, in operation, the lubricant is centrifugally forced radially outwardly through the said grooves to the said opposite sides, and lubricant traps which are supplied with lubricant from the said grooves and which are disposed on the said opposite sides.

No references cited.

DAVID J. WILLIAMOWSKY, *Primary Examiner.*
DON A. WAITE, *Examiner.*
FRANK SUSKO, *Assistant Examiner.*